United States Patent
Ha

(10) Patent No.: US 9,100,642 B2
(45) Date of Patent: Aug. 4, 2015

(54) ADJUSTABLE DEPTH LAYERS FOR THREE-DIMENSIONAL IMAGES

(75) Inventor: Hyeong-Seok Victor Ha, Toronto (CA)

(73) Assignee: Broadcom Corporation, Irvine, CA (US)

(*) Notice: Subject to any disclaimer, the term of this patent is extended or adjusted under 35 U.S.C. 154(b) by 993 days.

(21) Appl. No.: 13/233,657

(22) Filed: Sep. 15, 2011

(65) Prior Publication Data

US 2013/0069932 A1    Mar. 21, 2013

(51) Int. Cl.
*H04N 13/02* (2006.01)
*H04N 13/00* (2006.01)

(52) U.S. Cl.
CPC ...... *H04N 13/026* (2013.01); *H04N 2013/0081* (2013.01)

(58) Field of Classification Search
CPC .................................................... H04N 13/026
See application file for complete search history.

(56) References Cited

U.S. PATENT DOCUMENTS

| | | | |
|---|---|---|---|
| 6,348,918 B1* | 2/2002 | Szeliski et al. | 345/419 |
| 6,778,173 B2* | 8/2004 | Han et al. | 345/420 |
| 6,954,202 B2* | 10/2005 | Han et al. | 345/419 |
| 7,015,926 B2* | 3/2006 | Zitnick et al. | 345/592 |
| 7,206,000 B2* | 4/2007 | Zitnick et al. | 345/592 |
| 7,782,317 B2* | 8/2010 | Middler | 345/421 |
| 8,150,111 B2* | 4/2012 | Borland et al. | 382/128 |
| 8,411,931 B2* | 4/2013 | Zhou et al. | 382/154 |
| 8,478,016 B2* | 7/2013 | Robinson | 382/132 |
| 8,698,797 B2* | 4/2014 | Chen et al. | 345/419 |
| 8,711,204 B2* | 4/2014 | Smolic et al. | 348/43 |
| 2011/0080466 A1* | 4/2011 | Kask et al. | 348/43 |
| 2011/0169823 A1* | 7/2011 | Barenburg et al. | 345/419 |
| 2012/0050485 A1* | 3/2012 | Thorpe et al. | 348/46 |
| 2012/0274629 A1* | 11/2012 | Baek | 345/419 |
| 2012/0288184 A1* | 11/2012 | Zomet | 382/154 |
| 2012/0320152 A1* | 12/2012 | Seok | 348/42 |
| 2013/0057575 A1* | 3/2013 | An et al. | 345/619 |
| 2013/0071009 A1* | 3/2013 | Ha | 382/154 |

OTHER PUBLICATIONS

Shade et al. "Layered Depth Images" SIGGRAPH 98, (Jul. 1998).*
Bleyer et al. "A Layered Stereo Algorithm using Image Segmentation and Global Visibility Constraints" 2004 ICIP Proceedings.*
Berent et al. "Adaptive Layer Extraction for Image Based Rendering" (Oct. 2009) MMSP 2009 Proceedings.*
Zitnick et al. "Stereo for Image-Based Rendering using Image Over-Segmentation" (Feb. 2007) Inter. Jour. of Comp. Vision 75(1), 49-65.*

* cited by examiner

*Primary Examiner* — Sath V Perungavoor
*Assistant Examiner* — James Pontius
(74) *Attorney, Agent, or Firm* — Brinks Gilson & Lione

(57) ABSTRACT

A system and method for generating a three-dimensional image using depth layers is provided. A plurality of depth layers may be generated from the image, where each depth layer has a height, a width, and a thickness. Certain regions of the image may be assigned to one of the plurality of depth layers. A depth map may be generated based on the depth layers. Further, a disparity map may be generated based on both the depth map and the depth layers. A stereo view of the image may then be rendered based on the disparity map.

20 Claims, 7 Drawing Sheets

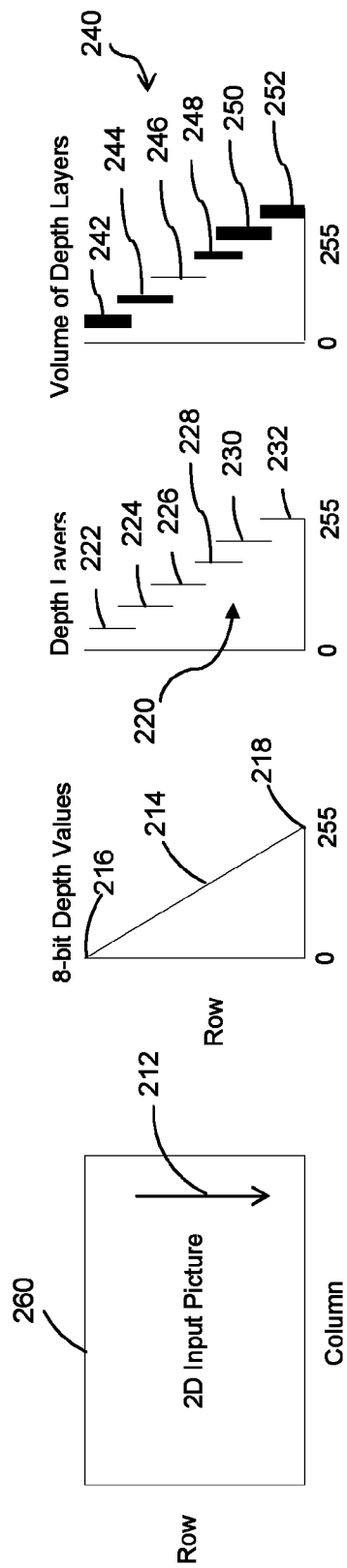

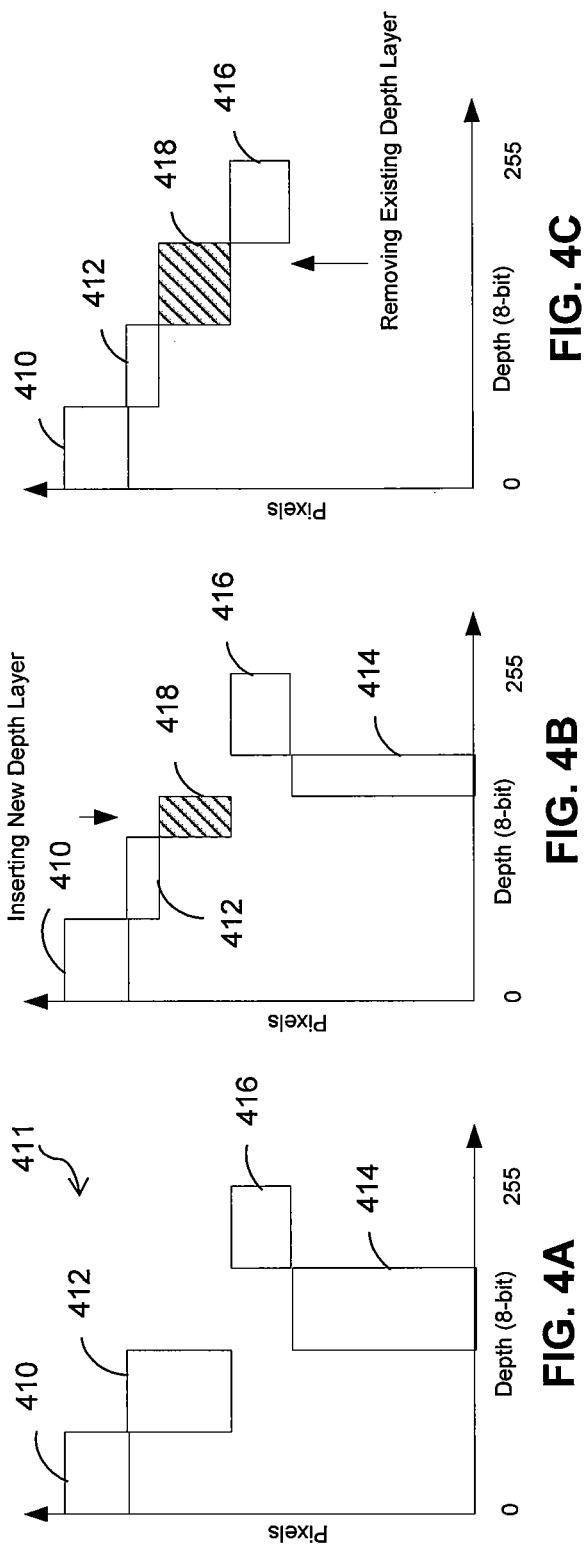

ADJUSTABLE DEPTH LAYERS FOR THREE-DIMENSIONAL IMAGES

BACKGROUND

1. Field of the Invention

The present invention generally relates to a system and method for generating three-dimensional images.

2. Description of Related Art

Three dimensional images are being used in various applications including three-dimensional television and three-dimensional gaming. Further, this technology is growing into new areas including various graphical displays for consumer and business applications. One significant attribute of a three-dimensional image is the range of depth and how the depth range is utilized for various applications. Many significant developments with regard to this attribute have not been realized.

BRIEF DESCRIPTION OF THE DRAWINGS

The system may be better understood with reference to the following drawings and description. In the figures, like reference numerals designate corresponding parts throughout the different views.

FIG. 2A-2D are illustrations of converting a two-dimensional image to a three-dimensional image and the use of depth layers;

FIG. 4A-4C are illustrations of a method for defining depth layers with dynamically allocated thicknesses;

DETAILED DESCRIPTION

Some aspects of this application describe a two-dimensional to three-dimensional conversion technique for stereoscopic three-dimensional television. In two-dimensional to three-dimensional conversion, depth information is extracted from input pictures in order to generate a pair of stereo output pictures. Extracting depth information is a key algorithm step in two-dimensional to three-dimensional conversion. Depth information can be extracted in spatial domain where a single input picture is used as the source of depth information. Depth information can also be extracted in spatiotemporal domain where more than one input picture in a video sequence is used as the source of depth information.

The method proposed generates temporally consistent and stable depth maps from one or more input pictures. Objects may be assigned to specific defined depth layers within the image to improve the range of the depth values and provide a simple way to store different objects within the image. The extracted depth information may be translated to pixel-by-pixel disparity values between the two stereo output pictures. Rendering of two output pictures using the disparity values completes the two-dimensional to three-dimensional conversion process. One system for implementing the described process is provided in FIG. 1.

Figure 1:
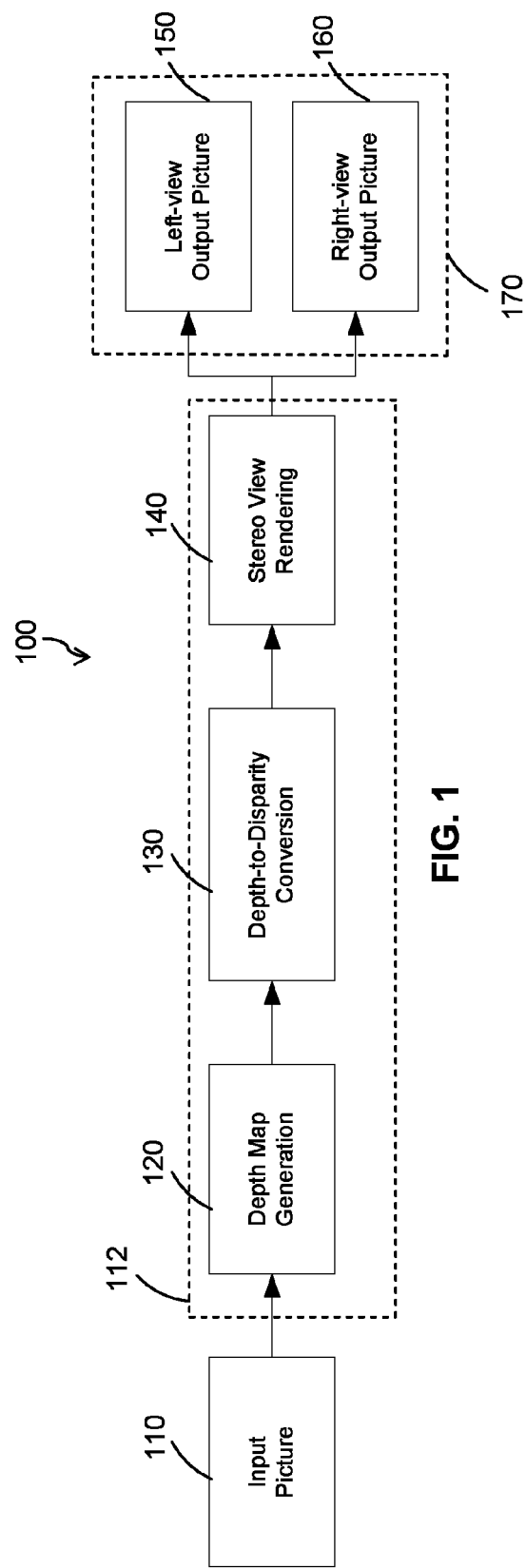
FIG. 1 is a block diagram illustrating two-dimensional to three-dimensional conversion.

Referring to FIG. 1, the system 100 is provided for generating a stereo image using depth information. Each of the modules or functional steps may be implemented, for example on a processor 112 in conjunction with memory storage or other input devices. As such, an input-picture 110 may be provided to a depth map generation module 120. The input image may be a two-dimensional image and the depth information can be extracted from in the spatial domain where two-dimensional image information including, for example, luma, chroma, and edge information may be used to estimate the depth level of certain regions.

A depth map is provided from the depth map generation module 120 to a depth-to-disparity conversion module 130. The depth-to-disparity conversion module 130 calculates a distance that a particular pixel will need to be shifted in a left-view output picture and/or the amount that a particular pixel will need to be shifted in a right-view output picture for a user to perceive the intended depth level in a stereo view. As such, a disparity map is provided from the depth-to-disparity conversion module 130 to the stereo view rendering module 140. The stereo view rendering module 140 renders the stereo image including generating the left view picture and the right view picture with the appropriate pixel shift values applied for the user to perceive each pixel at the appropriate depth level. Accordingly, the stereo view rendering module 140 may provide a left-view output picture 150 and a right-view output picture 160 to a display 170 that may be viewed by the user.

In the system described, maintaining temporally consistent and stable depth maps can be an important requirement for three-dimensional video generation. A few exemplary situations are described below:

In one example, certain portions of the picture are not moving or changing, e.g., remain static. When other portions of the picture undergo continuous or sudden changes in brightness, illumination, sharpness, focus, motion, occlusion, etc., the static parts must maintain their original depth levels over time.

In another example, a graphical element may be introduced into the existing scene (static or in motion). The graphical element can be placed at any depth level without interfering with or disturbing depth levels of the existing scene. A graphical element such as on screen displays (OSDs), menu, subtitles, etc. can be generated by a television or any other external source.

In yet another example, parts of the picture are continuously or suddenly changing, their relative depth levels must be maintained properly such that all parts are placed at logical depth levels throughout the scene and logical depth levels are maintained over time.

To deal with temporal consistency and stability of depth maps, the concepts of depth layers and depth layer volumes may be introduced into the system.

Now referring to FIG. 2A-2C, various depth layer implementations are illustrated. An image having 8-bit depth values is used for these examples. However, it is understood the other ranges of depth value, for example 16-bit, 32-bit, 64-bit, 128-bit or even greater depth values, may be readily used. In FIG. 2A, a two-dimensional view of the three-dimensional picture is noted by reference numeral 210. The input picture 210 includes rows of pixels where each successive row has an incremental increase in depth value from the top row to the bottom row along arrow 212.

Accordingly, a profile 214 of the depth values from the image 210 along arrow 212 is provided in FIG. 2B. The profile 214 of the depth value increases linearly from zero at the top row 216 to a maximum depth value at the bottom row of 218, which may be a value of 255 in an 8-bit system.

While the depth values may be continuous, it may also be helpful to separate certain regions of the picture 210 into depth layers 220. In FIG. 2C, each depth layer (222, 224, 226, 228, 230 and 232) may have a certain height and width corresponding to the region (and/or object) within the picture 210. However, the depth layers 220 are each illustrated such that every pixel in the depth layer has the same depth value. In this instance, the depth layer thickness would be a single depth value. The depth layers are also separated from one another in depth.

The concept of depth layer volume is illustrated in FIG. 2D. In FIG. 2D, certain regions of the picture 210 are separated into depth layers 240 with different volumes. Each depth layer (242, 244, 246, 248, 240 and 242) may have a certain height and width corresponding to the region (and/or object) within the picture 210. However, each depth layer may have a different thickness (number of depth values) as indicated in FIG. 2D. Each depth layer has a volume defined by its height, width, and thickness. Each layer is flexible in terms of its two-dimensional size (height and width) and its thickness range. For example, if depth values are equally distributed to all depth layers in an 8 bit system, there can be 8 depth layers with a thickness of 32 depth values or there can be 16 depth layers with a thickness of 16 depth values. If depth values are not distributed uniformly, any depth layer can potentially have thickness of 0 to 255 as long as the sum of all depth layer thicknesses is 255.

As such, each depth layer includes a thickness corresponding to a number of depth levels such that each pixel within the depth layer may have a different depth level corresponding to an origin point of the depth layer, for example, the center of the depth layer. Various regions may be easily updated over time with respect to the depth of that particular region. In addition, the depth levels in between each depth layer need not be wasted where the particular depth level is assigned to a given depth but no pixels within the image are assigned to that depth value.

One key to temporally consistent and stable depth maps is adaptive redistribution of available depth values between depth layers and depth layer thickness such that the central depth location of existing objects/regions remain the same.

Figure 3A:
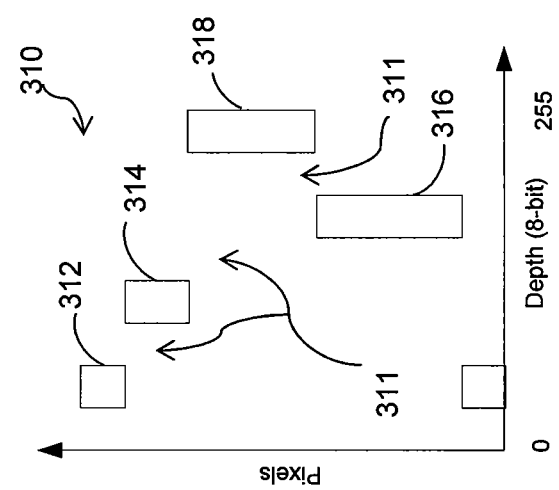
FIG. 3A-3C are illustrations of a method for defining depth layers with space between each layer.
Figure 3B:
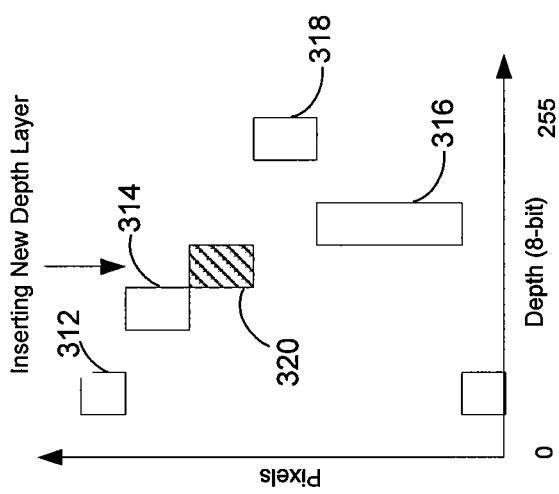
Figure 3C:
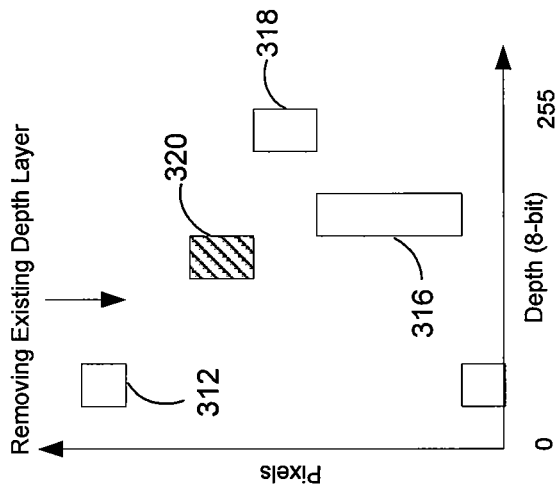

One aspect of the system is illustrated in FIG. 3A-3C. When depth layers are assigned to the regions/objects in the picture, not all depth layers need be defined. In some implementations, every other depth layer may used when the depth layers are initially defined, as illustrated in FIG. 3A. Then, when a new object or region appears at a separate depth level, a new depth layer is created using one of the unused depth layer locations.

In FIG. 3A, a plurality of depth layers 310 are illustrated where each depth layer 312, 314, 316, 318 that are initially defined for the image are defined such that unused depth layers and/or depth values are located between each of the depth layers 312, 314, 316, 318. The unused depth layers are denoted for example by arrow 311. At some point, a new region is identified within the image that appears to be at a separate depth level. As such, a new depth layer may be defined using a group of the unallocated depth levels 311 to define a new depth layer 320 without affecting the originally defined depth layers 312, 314, 316, and 318. This concept is illustrated in FIG. 3B.

In addition, as illustrated in FIG. 3C, depth layers may be easily removed as well. For example, depth layer 314 is removed in FIG. 3C. The removal of the depth layer may, therefore, also not affect the other remaining depth layers 312, 316, 318, 320, but may generate additional unallocated depth layers and depth values for future use. Further, each pixel may be stored with a depth value relative the overall image depth range and a layer identifier or each pixel may be stored with a local depth value relative to the depth layer origin and the layer identifier. When stored with a local depth value, the layer may be associated with a depth value relative the overall image depth range.

Another aspect of the system is illustrated in 4A-4C. In this example, the existing depth layers utilize the entire available depth value range. When a new object/region appears requiring a new depth layer to be created, the thickness of the existing layers is adjusted so that (1) the central locations of the existing depth layers remain the same and (2) the new depth layer can be inserted to any depth level desired without interfering with the other depth layers. One solution may be to manage the number of depth layers and the thickness of each depth layer dynamically in order to maintain the core central depth location of all depth layers.

Now referring to FIG. 4A, a plurality of depth layers 411 is provided where the depth layers are defined such that the entire range of depth levels is utilized by the plurality of depth layers. In one example, each of the depth layers 410, 412, 414, and 416 may be defined to utilize the entire number of depth levels. Each of the depth layers may have a different number of depth values, or each depth layer may include the same number of depth values, as illustrated in FIG. 4A. When a new region is identified such as a new object or graphic a depth layer may be inserted as illustrated by depth layer 418 in FIG. 4B. A depth layer origin, for example the core central depth location of each depth layer, may be maintained by reducing the depth levels at the top of the depth layer and depth levels at the bottom of the depth layer proportionally.

Accordingly, one or more of the existing depth layers may be modified to reduce the depth thickness or number of depth levels assigned to that depth layer. The reduced depth levels may then be reassigned to the new depth layer 418. In the example shown in FIG. 4B, depth layer 415 is reduced to half the number of depth levels as was originally assigned to that depth layer. The other half of the depth levels are then reassigned to depth layer 418. Similarly with this dynamic readjustment of depth layers, a depth layer may be easily removed. For example, in FIG. 4C, depth layer 414 is removed entirely. As such, depth layer 418 may then be expanded such that the number of depth layers are increased by the number depth levels that were previously assigned to deleted layer 414. A depth layer origin, for example the core central depth location of each depth layer, may be maintained by increasing the depth levels at the top of the depth layer and depth levels at the bottom of the depth layer proportionally. While the depth levels may be reallocated to a single depth layer, it is also understood that the depth layers may be reassigned to more than one depth layer or equally to all of the remaining depth layers based on the application requirements. Therefore, each depth layer may be increased proportionally above and below the depth layer origin to maintain the depth layer origin, such as the core central depth location.

The number of depth layers to be created or deleted and the volume of each depth layer can be determined by analyzing the input picture(s) in spatial and/or temporal domains. This can be accomplished, for example, by analyzing luma, chroma, and edge information, as well as, other two-dimensional information to estimate the depth level of certain regions and/or segment regions of the image.

Figure 5:
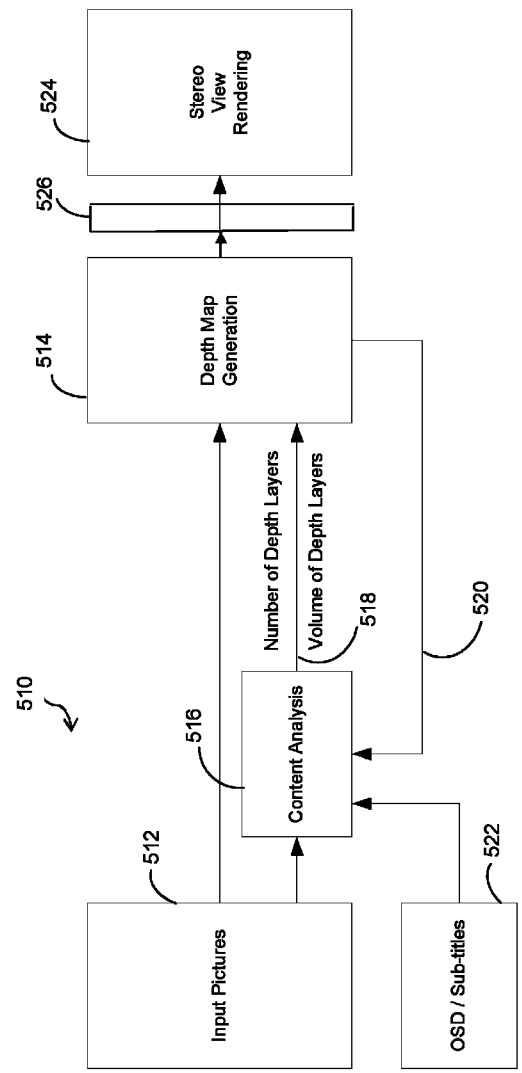
FIG. 5 is a schematic view of a system for adjusting depth maps using depth layers and depth layer volume information.

Now referring to FIG. 5, a system is provided that adjusts the depth layer map based on one or even multiple pictures that are temporally sequential. The input pictures 512 may be provided to a depth map generation module 514. In addition, the input pictures 512 may also be provided to a content analysis module 516. The content analysis module 516 may also receive graphics, on screen displays (OSDs), or subtitle information that is denoted by block 522. The content analysis module 516 may then provide the depth map generation module 514 with depth layer configuration information, such as a number of depth layers and a volume of each depth layer, as denoted by line 518, based on the input picture OSD, subtitles or graphic information. In addition, the content analysis module 516 may also determine the number of depth layers and the volume of each depth layers based on two-dimensional image information, such as luma, chroma, and edge information, as described above. The depth map generation module 514 may analyze the input picture or a temporal series of input pictures to determine a full depth map of the image. As such, the depth map generation module may associate each pixel with a depth layer and may determine its local depth value. Further, the depth map generation module 514 may provide feedback to the content analysis module 516, as denoted by 520.

The feedback may be based on a number of techniques, for example various motion estimation techniques. Further, the various techniques may consider both depth map data, as well as, the current number of depth layers and current volume of each depth layer to generate the feedback data. The feedback data may be used by the content analysis module to determine the configuration of each depth layer for subsequent images. The depth map generation module 514 may provide a depth map and layer data to the disparity estimation module 526. The disparity estimation module 526 may calculate left image disparity values and right image disparity values for each pixel based on the depth map and the layer data, for example the layer identification, layer depth origin, and local depth value. The disparity map may then be provided to the stereo view rendering module 524 to generate a stereo image for display to the user.

In some embodiments, the depth layer adjustment techniques may be embedded within a functional block of the depth map generation module 514 in FIG. 5. Temporal consistency and stability of depth maps may be assured using the feedbacks between and signal processing of the content analysis module and depth map generation module. Without special processing techniques that assure temporal consistency of depth maps, three-dimensional images created from two-dimensional input pictures may fluctuate or flicker in depth and in time.

Figure 6:
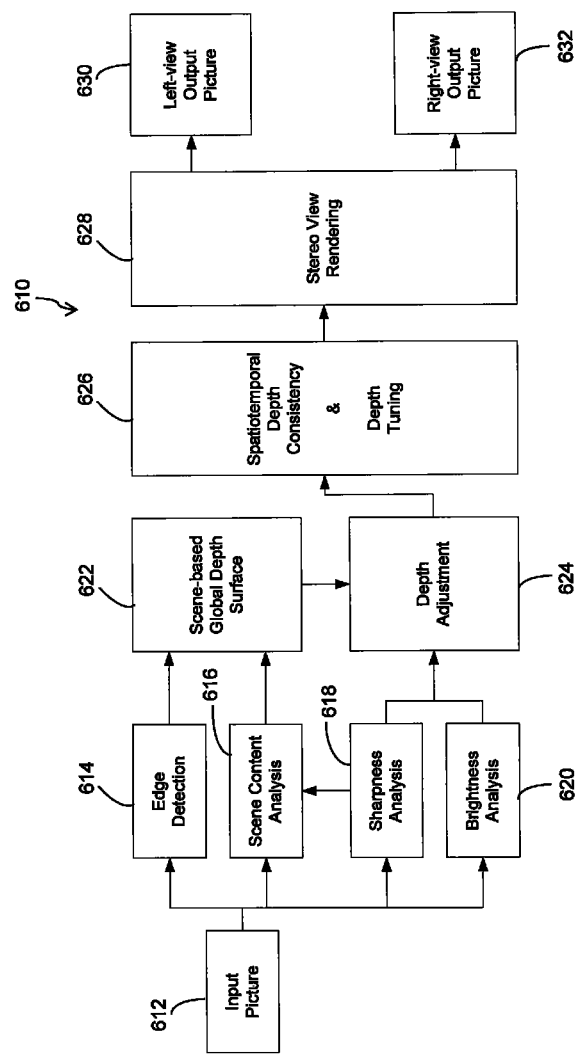
FIG. 6 is a schematic view of a system for adjusting depth maps using two dimensional image information.

There are many different ways of manipulating depth layers and volumes dynamically depending on the input scenes and past depth maps. In one example as illustrated in FIG. 6, depth layers may be implemented in a two-dimensional to three-dimensional conversion process, although the processing techniques may also be applied to identify depth information from two-dimensional data in any of the processes described above. In this particular example, spatial depth cues are identified that are most widely applicable and as general as possible. These spatial cues include scene-based global depth surface models, edge sharpness and blur.

The scene-based global depth surface model is used to create the initial depth map. Various methods may be used to create this initial depth map. Then, brightness information may be utilized as object/region segmentation cues. Brightness information does not necessarily provide depth information, but it does provide natural segmentation of the objects/regions in the input picture. It may be beneficial to codify this brightness information in such a way that depth values are adjusted accordingly based on the brightness of the region. For example, when brightness (or luma) values are similar in the local region, the depth values are not allowed to change much in that region. One embodiment of this concept is to limit the maximum range of depth value fluctuation of the given local region based on the brightness (or luma) value fluctuation of the same region.

The technique proposed above so far covers the cases when a single object/region has a uniform brightness (or luma) level. The method ensures that depth values are uniform in the uniform brightness region. There are other cases when a single object/region consists of different brightness (or luma) levels. The depth values assigned to such objects/regions should also remain uniform. To deal with this situation, the measurement of sharpness or blurriness may be used to indicate which portion of the input picture is in focus.

As the camera lens focus is a function of the distance from the camera to the object/region, all pixels sharing similar levels of sharpness/blurriness may belong to similar depth values (e.g., distance from the camera). When pixels belonging to very different brightness values are nearby in a local region, then the sharpness/blurriness of these pixels may be measured. If the sharpness/blurriness measurements are very similar, then all of these pixels may receive similar depth values. In this way, no significant fluctuation of depth values is allowed within the region with similar brightness and sharpness.

Now referring to FIG. 6, a system 610 is provided for generating a three-dimensional image based on a two-dimensional input picture. The two-dimensional input picture 612 may be provided to a variety of different image processing modules including an edge detection module 614, a scene content analysis module 616, a sharpness analysis module 618, and a brightness analysis module 620. There are many different methods for edge detection, for example, zero crossing based edge detection and search base edge detection methods.

Zero crossing based edge detection methods may identify zero crossings in a second order derivative expression computed from the image in order to determine the location of the edges. These may be zero crossing points, for example, the luma or values of a linear transform or the zero crossings of a non-linear differential expression. Prior to applying zero crossing based edge detection methods, a pre-processing step of smoothing, for example using a gaussian smoothing kernel, may be applied. In search based methods, edges may be detected by computing an edge strength, for example using a first order derivative expression such as gradient magnitude. Then local directional maxima of the gradient magnitude may be identified by computing an estimate of the local orientation of the edge. The edges may then be segmented and/or categorized and labeled. The edge detection results may be provided from the edge detection module 614 to a scene based global depth surface module 622.

In addition, the input picture 612 may be provided to a scene content analysis module 616. The scene content analysis may analyze changes in the scene for example, the changing of camera perspective including zoom, pan, tile as well as the change of various objects or regions within the scene. For example, objects may be identified from the video scene by various techniques, for example adaptive background subtraction or various other tracking methodologies. The scene content analysis data from the scene content analysis module 616 may be provided to the scene based global depth surface module 622.

In addition, the input picture 612 may be provided to a sharpness analysis module 618. The sharpness analysis module 618 may look at the sharpness of edge transitions and certain regions within the image to determine an approximate depth of that region of the image. The sharpness and/or gradient of a particular region would correspond to a depth of a particular region in the image relative to the focal point of the optical system providing the image to the camera. The results of the sharpness analysis module 618 may be provided to a depth adjustment module 624. In addition, the results of the sharpness analysis module 618 may also be provided to the scene content of the analysis module 616, where the scene content analysis module may generate the scene content analysis based on the sharpness analysis data.

The input picture 612 may also be provided to a brightness analysis module 620. The brightness analysis module 620 may analyze the input picture 612 to identify and segment various objects or regions within the image based on brightness characteristics of the image for example, luma or chroma or similar brightness characteristics. The brightness analysis module 620 may provide brightness data to the depth adjustment module 624.

Now referring to the scene based global depth surface module 622, the edge detection data from the edge detection module 614 and the scene content data from the scene content analysis module 616, may be used together to generate a model that identifies the various regions within the image based on one or more surface segments where each surface segment has a given depth contour calculated based on the edge detection information and the scene content data. The global depth surface model from the scene based global depth surface module 622 may be provided to the depth adjustment module 624.

The global depth surface model may be used in conjunction with the sharpness data and the brightness data to adjust the depth of certain regions within the input picture. These regions may be placed into particular depth layers, where each depth layer, as described above, may have a layer identification, a layer depth origin, and a layer depth volume such that particular regions and/or objects may be easily tracked across multiple images while providing efficient use of the available depth range. The depth adjustment module 624 may provide depth adjustment information including layer configuration information such as a number of layers and the volume of each layer to a spatial temporal depth consistency and depth tuning module 626.

The spatial temporal depth consistency module and depth tuning module 626 may generate a depth map based on the depth adjustment information, as well as the pixel information provided from the input picture. The spatial temporal depth consistency and depth tuning module 626 may provide a depth map to a stereo view rendering module 628. A disparity map may be generated from the depth map either in the stereo view rendering module 628 or a separate disparity map generation module may be located between the spatial temporal depth consistency and depth tuning module 626 and the stereo view rendering module 628. A stereo view rendering module may utilize the disparity map to generate a left view output picture 630 and right view output picture 632 that may be provided to a three-dimensional display unit to present a three-dimensional image to a user.

Figure 7:
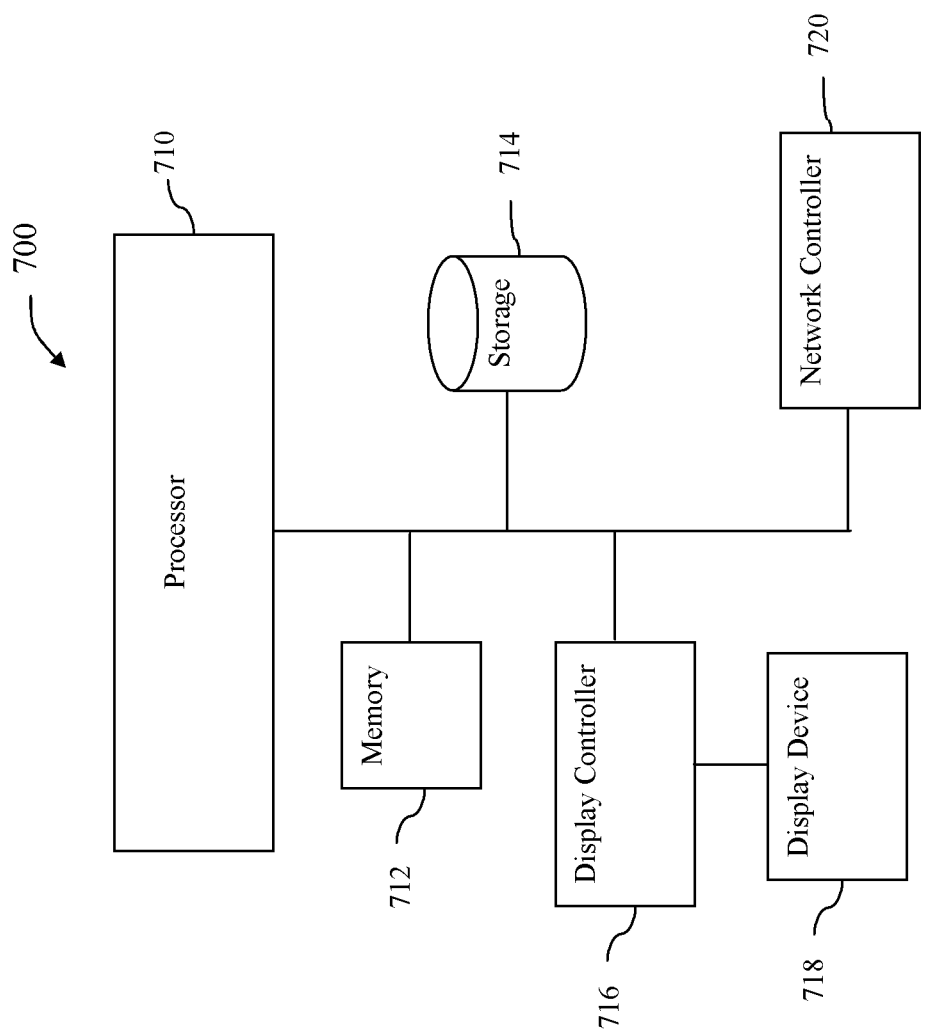
FIG. 7 is a block diagram for one example of a processor system capable of implementing the methods described herein.

Any of the modules, servers, or engines described may be implemented in one or more integrated circuits or processor systems. One exemplary system is provided in FIG. 7. The processing system 700 includes a processor 710 for executing instructions such as those described in the methods discussed above. The instructions may be stored in a computer readable medium such as memory 712 or storage devices 714, for example a disk drive, CD, or DVD. The computer may include a display controller 716 responsive to instructions to generate a textual or graphical display on a display device 718, for example a computer monitor. In addition, the processor 710 may communicate with a network controller 720 to communicate data or instructions to other systems, for example other general computer systems. The network controller 720 may communicate over Ethernet or other known protocols to distribute processing or provide remote access to information over a variety of network topologies, including local area networks, wide area networks, the Internet, or other commonly used network topologies.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

As a person skilled in the art will readily appreciate, the above description is meant as an illustration of the principles of this application. This description is not intended to limit the scope of this application in that the system is susceptible to modification, variation and change, without departing from spirit of this application, as defined in the following claims.

What is claimed is:

1. A system for generating a three dimensional image, the system comprising:
    a processor configured to access an image, the processor being configured to generate a plurality of depth layers from the image, each depth layer having a height, a width, and a thickness, the processor further being configured to assign regions of the image to one of the plurality of depth layers, generate a depth map based on the depth layers, generate a disparity map based on both the depth map and the depth layers, and render a stereo view of the image based on the disparity map, the processor being configured to actively redistribute the regions to the depth layers in response to the identification of objects or graphics in the image.

2. The system according to claim 1, wherein the processor is configured to actively redistribute the regions to the depth layers in response to the identification of graphics.

3. The system according to claim 1, wherein additional depth layers are added based on region information.

4. The system according to claim 1, wherein depth layers are removed based on identifying a new region.

5. The system according to claim 1, wherein at least one of the regions is an object in the image.

6. The system according to claim 1, wherein at least one of the regions is a graphic or sub-title.

7. The system according to claim 1, wherein the processor is configured to retain at least one unallocated depth level between each allocated depth layer when each depth layer is initially allocated.

8. The system according to claim 1, wherein the processor is configured to actively redistribute depth levels to depth layers, thereby changing the thickness of a depth layer based on identifying a new region.

9. The system according to claim 1, wherein the central depth location of each depth layer remains the same after adding new depth levels.

10. The system according to claim 1, wherein the central depth location of each depth layer remains the same after removing depth levels.

11. The system according to claim 1, wherein the system includes a content analysis module and depth map generation module, content analysis module defines the configuration of a plurality of layers based on analysis of the two dimensional image, the depth map generation module allocates pixels to each layer, where the depth map generation module provides feedback to the content analysis module to adjust the layer configuration.

12. The system according to claim 1, wherein the depth map generation module provides the number of depth layers and the volume of each depth layer as feedback to the content analysis module to adjust the layer configuration.

13. The system according to claim 1, wherein each pixel of the image is stored with a layer identification.

14. The system according to claim 1, wherein each pixel of the image may be associated with a depth layer based on brightness or sharpness information.

15. A method for generating a three dimensional image, the method comprising the steps of:
  accessing an image;
  generating a plurality of depth layers from the image, each depth layer having a height, a width, and a thickness;
  assigning regions of the image to one of the plurality of depth layers;
  actively redistributing the regions to the depth layers in response to identifying an object or a graphic in the image;
  generating a depth map based on the depth layers;
  generating a disparity map based on both the depth map and the depth layers; and
  rendering a stereo view of the image based on the disparity map.

16. The method according to claim 15, further comprising identifying a new region in the image and either adding additional depth layers or removing depth layers based on identifying the object or the graphic.

17. The method according to claim 15, further comprising actively redistributing depth levels to the depth layers, thereby changing the thickness of a depth layer based on identifying the object or the graphic.

18. A system for generating a three dimensional image, the system comprising:
  a processor configured to access an image, the processor being configured to generate a plurality of depth layers from the image, each depth layer having a height, a width, and a thickness, the processor further being configured to assign regions of the image to one of the plurality of depth layers, actively redistribute the regions to the depth layers, and actively redistribute depth levels to depth layers thereby changing the thickness of a depth layer based on identifying an object or a graphic in the image;
  wherein additional depth layers are added or removed based on identifying the object or the graphic and the central depth location of each depth layer remains the same after adding or removing depth levels;
  wherein the processor includes a content analysis module and depth map generation module, content analysis module defines the configuration of a plurality of layers based on analysis of the two dimensional image using brightness or sharpness information, the depth map generation module allocates pixels to each depth layer, where the depth map generation module provides the number of depth layers and the volume of each depth layer as feedback to the content analysis module to adjust the layer configuration; and
  wherein the processor is further configured generate a depth map based on the depth layers, generate a disparity map based on both the depth map and the depth layers, and render a stereo view of the image based on the disparity map.

19. The system according to claim 18, wherein the processor is configured to retain at least one unallocated depth level between each allocated depth layer when each depth layer is initially allocated.

20. The system according to claim 18, wherein the processor is configured to actively redistribute depth levels to depth layers, thereby changing the thickness of a depth layer based on identifying a graphic in the image.

* * * * *